United States Patent Office 3,131,048
Patented Apr. 28, 1964

3,131,048
STABLE METAL CHELATE PREPARATIONS
Leslie L. Balassa, Creighton Lane, Scarborough, N.Y.
No Drawing. Filed May 2, 1960, Ser. No. 25,828
3 Claims. (Cl. 71—1)

This invention relates to the improvement of soils for agricultural use. More particularly the invention concerns novel metal chelate compositions and the method of applying these to agricultural soils.

It is known that many kinds of growing plants, trees, and crops are injured by conditions attributable to soil alkalinity which tend to make unavailable to the plants necessary trace mineral nutrients. Thus, the deficiency disease called iron chlorosis, to which citrus, avocado, and pear trees are particularly susceptible, is believed to be caused by a deficiency of iron in the soil in a form which is readily capable of being absorbed by the plant. Analogous injuries to plants may arise through the unavailability of other metals essential to plant life in a form sufficiently soluble to be readily absorbed by the root systems of vegetation. Metal chelates have been employed for some time in agriculture to correct these soil deficiencies. Thus, the use of the iron chelate of ethylenediamine-tetraacetic acid (EDTA) for treatment of iron chlorosis in citrus plants has been reported by Stewart and Leonard in Citrus Magazine, vol. 44, No. 10, pages 22–25 (1952). Experience with chelates of EDTA, and particularly with iron chelates of this ligand, has shown that they are not stable at pH 7 or higher pH values. Related compounds are known which will form chelates stable at pH values of 7 or higher, such as, for example, ethylenediamine di-(o-hydroxyphenylacetate), but the preparation of such compounds is time consuming and costly, making them uneconomical for agricultural use. Moreover, many ligands of this type are toxic to plant life and may retard the growth of certain plants.

It is known that organic hydroxycarboxylic acids in which the hydroxy group is in alpha position to a carboxyl group, are capable of forming chelates with a number of metals, such acids including, for example, glycolic, lactic, citric, tartaric and gluconic acids. While the ligand portions of the chelate molecule are not phytotoxic, the chelate compounds of these hydroxy acids tend to be unstable at alkaline pH levels. However, if a method were available for the preparation of metal chelates of alpha-hydroxy carboxylic acids in a form stable at alkaline pH values, the resulting preparations would be adaptable for agricultural use in correcting soil deficiencies, and particularly in connection with alkaline soils. Experimentation along these lines, however, indicated that in general, when solutions of metal salts and alpha-hydroxycarboxylic acids were mixed in such proportions that the ratio of metal to ligand was equimolecular, the metal was partially precipitated as a basic salt or hydroxide at low pH values, and in some instances, even where an effort was made to adjust the pH to a higher value with sodium hydroxide or ammonia. This was found to be the case, for example, when equimolecular proportions of ferric ion in the form of ferric chloride solution, and of glycolic acid were mixed, a precipitate of insoluble basic iron salt or iron hydroxide forming even at pH 2–2.5. Thus, at this low molar ratio of ligand to metal, even though the glycolic acid is normally a strong chelating agent, the bonding of metal to the ligand atoms by ordinary and coordinate valence forces is insufficient to avoid a degree of dissociation of the chelate yielding enough ferric ion to be precipitable, particularly under alkaline conditions.

As pointed out in "Organic Sequestering Agents," by Chaberek and Martell (1959), at page 100, the chelate formation constant is generally taken as the equilibrium constant for the reaction in which the metal chelate is formed from the hydrated metal ion and the most basic (most highly dissociated) form of the chelating agent:

$$M^{+n} + A^{-m} \rightleftharpoons MA^{n-m}$$

$$K_{MA} = \frac{[MA^{n-m}]}{[M^{+n}][A^{-m}]}$$

wherein the brackets indicate the molar concentration, $n$ and $m$ are valences, and the constant applies to a specific temperature. When a ligand contains a relatively small number of coordinating groups, reaction with a metal ion usually involves the formation of a series of metal chelates containing 1, 2, or more ligands per metal atom. In systems containing weak chelating agents or in very acid solutions, the dissociation of the chelate MA may be appreciable, thus making it capable of yielding up the metal ions which it is intended to chelate or sequester. In the case of ferric ion with glycolic acid as the ligand, the formation constant, expressed as a logarithmic value, is 4.7, indicating that the ratio of the concentration of nonionized chelate to the product of the concentration of the ferric ion and of the chelating is 29,512:1, and signifying a very low concentration of ferric ion. In hydroxy acid ligands, the metal ion is believed to coordinate not only with the acid group but with the weakly coordinating hydroxyl group. This produces relatively low stability of the chelate, particularly in the pH range up to about 10–11. Only in the very strongly alkaline pH range, exceeding about pH 11, and in presence of free alkali, do the chelates become more stable, owing to the formation of alkoxide bonds at this pH level.

In accordance with the present invention, it has been found that aqueous solutions of metal chelates of alpha-hydroxy carboxylic acids can be prepared which are stable and which will not form precipitates of the metal within a pH range from about 6.0 to 9.5 and up to pH 10–11. These novel chelate solutions which are stable at high pH values, such as those encountered in alkaline soils, have been found, in accordance with the invention, to be those in which the molar ratio of ligand to chelating metal ranges from about 1.40:1 to about 20:1, and preferably between about 2:1 and about 20:1. Metal chelates with alpha-hydroxy carboxylic acid ligands which are stable at high pH values are prepared, in accordance with this invention, by a general procedure of providing aqueous solutions of metal salt and of ligand acid, in the molar ratios indicated, and then adjusting the pH of the solution by addition of an alkali metal hydroxide such as sodium hydroxide and/or ammonium hydroxide preferably to a value between about 6.5 and about 7.5. At this pH range, a clear solution of chelate is obtained, which can be diluted with water to a concentration of less than 0.1% metal without precipitation of any metal hydroxide or basic hydroxide.

Where the molar ratio of ligand to metal used to form the chelate is maintained between about 1.40:1 and 4:1, the pH adjustment to value 6.5–7.5 may be made simply by addition of ammonium hydroxide to the solution. However, where the molar ratio is maintained between 4:1 and 20:1, it is preferable to adjust the pH of the mixture initially with sodium hydroxide to a pH value of about 3.5, and then to complete the pH adjustment to 6.5–7.5 with ammonium hydroxide.

It has been found further, in accordance with the invention, that the stability of the chelate solutions toward higher pH values can be improved by buffering the solutions with an organic nitrogen compound, such as for example, an amide, such as urea, biuret, triuret, melamine or guanidine, or with an amine, such as diethylamine, triethylamine, dipropylamine, tertiary butyl amine, ethylenediamine, diethylenetriamine, tetraethylenepentamine, or morpholine, or with an alkanolamine, such as ethanolamine, diethanolamine, or triethanolamine, ethyl-diethanolamine, or the like, or with mixtures of such amides and amines. Urea or triethanolamine are preferred for this purpose. These buffering agents serve to protect the chelates against precipitation in highly alkaline soils, and eliminate the slight precipitation which may at times occur in their absence. They also protect plants from injury which may arise from diminution of the pH in the soil by reason of evaporation of the ammonia in the solution, by moderating the pH change. The buffering agents selected should be soluble in the chelate solution, and any salts formed with the ligand acid and with the metal salt anion must be water soluble. Moreover, the resulting salts should not be toxic to plants.

The metal chelate preparations of the present invention are preferably those of metals which are known to be essential trace elements in plant nutrition. These metals include iron, copper, zinc, and manganese, but iron is the most important of these metals since it is the one most often found to be deficient in soils. It is to be understood, however, that the invention is applicable to any metals which are capable of forming chelates with the alpha-hydroxy carboxylic acid ligands herein disclosed. Moveover, the metals may also include calcium, magnesium, or cobalt.

The alpha-hydroxycarboxylic acids contemplated as ligands by this invention are those which contain a hydroxy group in alpha-position to a carboxylic acid group, and include both aliphatic and aromatic mono- and polycarboxylic acids. Thus, examples of aliphatic hydroxycarboxylic acids include glycolic, lactic ($\alpha$-hydroxypropionic), $\alpha$-hydroxybutyric, $\alpha$,hydroxyisobutyric, $\beta$-hydroxybutyric, gluconic, malic (2-hydroxybutane-dioic), citric, glyceric, mucic, gluconic, and tartaric acids. Suitable aromatic carboxylic acids include salicylic acid, mandelic acid, ortho-hydroxyphthalic acid, o-hydroxytoluic acid, and $\alpha,\beta$-hydroxynaphthoic acid.

The stable chelate solutions of this invention are prepared from the water soluble salts of the metals, such as, for example, the chlorides, sulfates, or nitrates of iron, copper, manganese or zinc.

For the preparation of the chelate solutions, the metal salt solutions are preferably employed in molar concentration. The ligand acid solutions are employed in molar concentrations ranging from 1.40 upward to 20 molar. Usually it is simpler to dissolve the metal salt in the solution of the ligand acid, and this method is preferred. The sodium hydroxide is advantageously added for pH adjustment purposes in the form of a 10% solution in water. The ammonium hydroxide is preferably employed in the form of a solution of 28% $NH_3$ strength. The buffering agent is advantageously dissolved in the mixture of metal salt and ligand acid in amounts ranging from about 5 molar to 30 molar. Where triethanolamine is used as the buffering agent, it is preferably added in the form of a 20% aqueous solution, until the desired pH value of the mixture is reached.

The chelate solutions are applied to agricultural soils on the basis of the iron requirements of the plants planted in the soil. In the case of citrus trees, showing iron chlorosis, the chelates are usually applied in amounts of about 20 grams of Fe per tree. To obtain this quantity of iron requires about 14 ounces per tree of a chelate containing about 5% Fe. About 10 grams of Fe per tree was found sufficient to correct mild cases of iron chlorosis. The iron chelate may be applied to the soil around the chlorotic trees, or it may be mixed with a fertilizer. In the case of calcareous soils having a pH above 7, the chelate solution may be, for example, at the rate of about 100 grams of Fe per tree or about 4.5 pounds per tree of a chelate containing 5% Fe. In general, the chelate compositions of this invention are applied to agricultural soils in the form of an aqueous solution comprising between about 0.12% and about 15% by weight of a metal in the form of a chelate of an organic alpha hydroxycarboxylic acid ligand.

The iron chelates, especially those having a high ligand:metal ratio such as 5:1 or higher, are satisfactory for correcting lime-induced chlorosis of citrus trees on calcareous soils.

Greening of chlorotic trees even on high pH soils has been accomplished with soil applications of up to 100 grams of chelated iron per tree using chelates of Examples 5 or 7.

For application as a foliage spray the lower ligand to metal ratios were found more satisfactory especially when buffered with urea or with other organic nitrogen compounds. The buffering has prevented the "burning" of the leaves frequently associated with the application of highly acid leaf sprays. The use in foliage sprays of the manganese chelate composition described in Example 8 was found particularly effective in overcoming manganese deficiency of the plants. However, manganese, zinc, and copper chelates described in Examples 8, 9 and 10 are effective in combating deficiency of these metals in the plants when the chelates are incorporated into the agricultural soil in the required concentration.

These chelates were found most effective when they were applied in accordance with the particular soil and plant requirements. The optimum ratios were established by actual experiments. In soils of pH 7–8 using iron chelate of Example 5, the following application rates were found effective:

| Plant height (ft.) | Fe per tree, grams |
| --- | --- |
| Up to 2 ft | 2 |
| 2 to 4 ft | 4 |
| 4 to 6 ft | 5 |
| 6 to 10 ft | 10–20 |
| 10 to 15 ft | 20–50 |
| Large trees | 50–100 |

The chelate was thoroughly watered into the soil, followed by the normal irrigating procedure.

If leaf burning is observed the chelate has been applied in excessive quantities. In successive applications, therefore, the quantity of the chelate was reduced and the buffer increased.

The following woody plants responded favorably to soil applications of the iron chelates described in the specification of this patent application: Acacia, Abelia, Azalea, Avocado, Bauhinia, Citrus, Erythrins, Gardenia, Hydrangea, Liquidamber, Leptospermum, Macadamia, Magnolia, Ochna, Pyracantha, and Rose. Response of any plant was directly related to the condition and the extent of the root system.

The chelate solutions when applied to soils are in general resistant to microbial degradation by soil bacteria and fungi, but the simpler hydroxy acids, especially glycolic acid are especially resistant. Chelates prepared from glycolic acid therefore represent a preferred embodiment of the invention. When applied to alkaline soils having a pH of 7.0 or greater, as by spraying the upper half inch of the soil with the chelate solution, a solution of ferric glycolic acid chelate, applied in grapefruit, orange, or avocado groves, in amounts ranging from 20 and 45 grams of iron per tree produced a marked elimination of iron chlorosis. The result was equal to or better than that obtained with a commercial iron chelate based on ethylenediamine-di-(o-hydroxyphenyl acetate).

The following examples serve to illustrate the preparation and application of the novel chelate compositions of this invention, but it will be understood that they are not to be regarded as limiting.

*Example 1*

A ferric ion, glycolic acid chelate was prepared having a molar ratio of ligand to iron of 2:1, by dissolving crystals of $FeCl_3 \cdot 6H_2O$ in an aqueous solution of glycolic acid in the following proportions:

| | Parts by weight |
| --- | --- |
| $FeCl_3 \cdot 6H_2O$ | 270 |
| Glycolic acid (70%) | 217 |
| Water | 217 |

Ammonium hydroxide (28% NH$_3$) was added with mixing until the pH of the solution was 6.5. A clear brown solution was obtained which could be diluted with water to a concentration of less than 0.1% Fe without precipitation of iron hydroxide.

Example 2

The preparation of a ferric ion, glycolic acid chelate having a molar ratio of ligand to iron of 4:1 was prepared by dissolving ferric chloride in glycolic acid and water in the following proportions:

| | Parts by weight |
|---|---|
| FeCl$_3$.6H$_2$O | 270 |
| Glycolic acid (70%) | 435 |
| Water | 217 |

A 10% solution of sodium hydroxide was added to the solution under constant mixing until the pH reached 3.5. Then a solution of ammonium hydroxide (28% NH$_3$) was added with stirring until the pH value reached 7.0. A clear brown solution was obtained which was stable on dilution with water to a concentration of 0.1% Fe.

Example 3

Following a procedure similar to that of Example 2, but employing a molar ratio of ligand to iron of 6:1, a solution was prepared of the following composition:

| | Parts by weight |
|---|---|
| FeCl$_3$.6H$_2$O | 270 |
| Glycolic acid (70%) | 651 |
| NaOH | 120 |
| Water | 200 |

The sodium hydroxide was dissolved in the water and this solution was added to the glycolic acid. The ferric chloride was then dissolved in the partly neutralized glycolic acid. Ammonium hydroxide (28% NH$_3$) solution was then added to reach a pH value of 7.5. A clear brown solution was obtained which was stable on dilution to 0.1% Fe.

Example 4

This example illustrates the preparation of a ferric ion glycolic acid chelate solution buffered with urea. Ferric chloride was dissolved in glycolic acid solution in the proportions shown below, and then the indicated amount of urea was added and dissolved:

| | Parts by weight |
|---|---|
| FeCl$_3$.6H$_2$O | 270 |
| Glycolic acid (70%) | 435 |
| Water | 435 |
| Urea | 400 |

Sufficient ammonium hydroxide solution (28% NH$_3$) was then added with stirring to bring the pH to 7.5.

Example 5

This example is similar to that of Example 4, except that ferric nitrate was used instead of the chloride. The ferric nitrate was dissolved in the glycolic acid solution and then the urea was added resulting in a clear solution:

| | Parts by weight |
|---|---|
| Fe(NO$_3$)$_3$.6H$_2$O | 350 |
| Glycolic acid (70%) | 1,080 |
| Urea | 700 |

The ligand-metal ratio here is 10:1. Ammonium hydroxide was added with stirring until the pH reached 7.5.

Example 6

This example illustrates buffering with triethanolamine. Ferric sulfate and glycolic acid were employed in a ligand:iron ratio of 10:1. The ferric sulfate was dissolved in the glycolic acid and then a 20% solution of triethanolamine in water was added with constant stirring until a pH of 6.5 was obtained. The proportions of the ingredients were:

| | Parts by weight |
|---|---|
| Fe$_2$(SO$_4$)$_3$.9H$_2$O | 282 |
| Glycolic acid (70%) | 1,080 |

Example 7

The use of a very high ligand:metal ratio of 20:1 is shown in this example, wherein ferric chloride was dissolved in glycolic acid, urea was added and dissolved, in the proportions shown below:

| | Parts by weight |
|---|---|
| FeCl$_3$.6H$_2$O | 270 |
| Glycolic acid (70%) | 2,160 |
| Urea | 2,000 |

Sufficient ammonium hydroxide was added to bring the pH value to 7.5.

Example 8

The preparation of a manganese chelate employing a ligand:manganese ratio of 6:1 is as follows. Manganese nitrate is dissolved in water and glycolic acid, and urea buffer was then added, in the amounts shown:

| | Parts by weight |
|---|---|
| Mn(NO$_3$)$_2$.6H$_2$O | 287 |
| Glycolic acid | 651 |
| Water | 200 |
| Urea | 300 |

Sufficient ammonium hydroxide was added to reach a pH of 6.5.

Example 9

The preparation of a zinc chelate employing a ligand:zinc ratio of 4:1 is as follows: Zinc nitrate was dissolved in water and glycolic acid and urea buffer added to the solution, in the amounts shown:

| | Parts by weight |
|---|---|
| Zn(NO$_3$)$_2$.3H$_2$O | 243 |
| Glycolic acid (70%) | 435 |
| Water | 100 |
| Urea | 300 |

Sufficient ammonium hydroxide was added to bring the pH to 6.5. A clear colorless solution resulted.

Example 10

The preparation of a copper chelate employing a ligand:copper ratio of 4:1 is as follows: Copper sulfate crystals were dissolved in water and glycolic acid, followed by addition of urea to the solution. Sufficient ammonium hydroxide then added to bring the pH value to 6.5. The proportions employed were as follows:

| | Parts by weight |
|---|---|
| CuSO$_4$.5H$_2$O | 250 |
| Glycolic acid (70%) | 435 |
| Water | 600 |
| Urea | 300 |

I claim:

1. A metal chelate composition adapted for application to plants and soils which is stable and will not form a precipitate upon dilution with water nor within a pH range from about 6 to about 11, comprising an aqueous solution of a chelate of a soluble inorganic salt of a metal selected from the group consisting of iron, manganese, zinc, copper, cobalt, calcium ad magnesium with a chelating acid selected from the group consisting of aliphatic hydroxy carboxylic acids containing from 2 to 6 carbon atoms and benzene carboxylic acids each acid containing a hydroxy group in alpha position to a carboxylic acid group, said solution having a pH between about 6.5 and about 7.5, the molar ratio of chelating acid to metal present being between about 1.4:1 and about 20:1, said chelate benig prepared by dissolving said metal salt directly in an aqueous solution of said chelating acid in accordance with the aforesaid molar ratio and then adjusting the pH of the solution to between about 6.5 and about 7.5 by means of an alkali hydroxide.

2. Method of preparing a metal chelate solution adapted for application to plants and soils which is stable and will not form a precipitate upon dilution with water nor within a pH range from about 6 to about 11, consisting essentially of the steps of dissolving a soluble inorganic salt of a metal selected from the group consisting of iron, manganese, zinc, copper, cobalt, calcium and magnesium directly in an aqueous solution of a chelating acid selected from the group consisting of aliphatic hydroxy carboxylic acids containing from 2 to 6 carbon atoms and benzene carboxylic acids each acid containing a hydroxy group in alpha position to a carboxylic acid group, the molar ratio of chelating acid to metal present being between about 1.4:1 and about 20:1, and adjusting the pH of the solution to between about 6.5 and about 7.5 by means of an alkali hydroxide.

3. A metal chelate composition adapted for application to plants and soils which is stable and will not form a precipitate upon dilution with water nor within a pH range from about 6 to about 11, comprising an aqueous solution of a chelate of a soluble inorganic salt of iron and glycolic acid, said solution having a pH between about 6.5 and about 7.5, the molar ratio of glycolic acid to iron present being between about 1.4:1 and 20:1, said chelate being prepared by dissolving said iron salt directly in an aqueous solution of said glycolic acid in accordance with the aforesaid molar ratio and then adjusting the pH of the solution to between about 6.5 and about 7.5 by means of an alkali hydroxide.

References Cited in the file of this patent

UNITED STATES PATENTS

| 2,534,787 | Mecca et al. | Dec. 19, 1950 |
| 2,921,847 | Knell et al. | Jan. 19, 1960 |
| 2,943,100 | Holstein | June 28, 1960 |

OTHER REFERENCES

Industrial and Engineering Chemistry, "Sequestration by Sugar Acids," C. L. Mehltretter et al., vol. 45, No. 12, December 1953, pages 2782–2784, 71–2.5C.